March 14, 1933. S. S. MATTHES 1,901,401
CONDUCTOR SUPPORT
Filed March 11, 1931

Inventor
SAMUEL S. MATTHES
By
Attorney

Patented Mar. 14, 1933

1,901,401

UNITED STATES PATENT OFFICE

SAMUEL S. MATTHES, OF MANSFIELD, OHIO, ASSIGNOR TO THE OHIO BRASS COMPANY, OF MANSFIELD, OHIO, A CORPORATION OF NEW JERSEY

CONDUCTOR SUPPORT

Application filed March 11, 1931. Serial No. 521,659.

My invention relates to supports for conductors and particularly trolley wires.

The object of my invention is to provide a support which has a renewable wear part and one which can be readily and economically replaced and which can be made of various compositions of metal as for instance rolled copper, bronze and brass or of rolled ferrous metals.

My invention resides in the new and novel construction, combination and relation of the various parts herein described and shown in the accompanying drawing.

In the drawing:—

Figure 1:
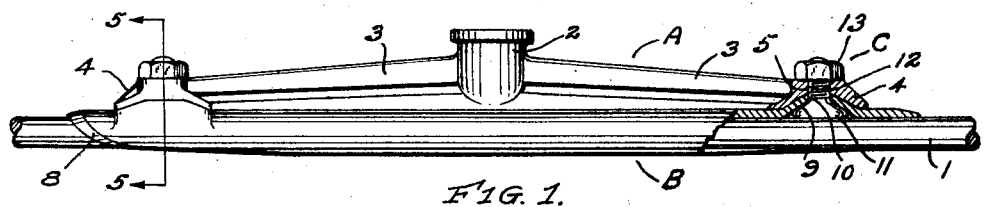
Fig. 1 is a side view in elevation and partial section of my invention.
Figure 2:
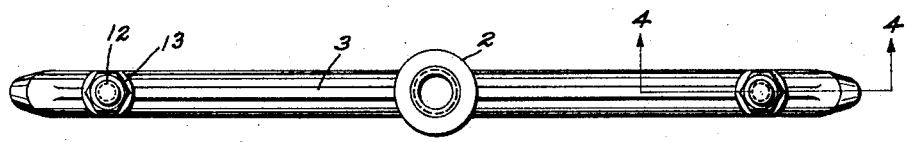
Fig. 2 is a top view of Fig. 1.
Figure 3:
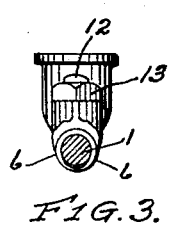
Fig. 3 is an end view of Fig. 1.

My invention comprises three distinct parts namely, a yoke member A, the grooved member B and the holding members C.

The member A is made preferably of a casting either ferrous or non-ferrous.

The member B is made preferably from sheet material formed to shape to provide a groove to fit the trolley wire 1 and having lips which are bendable about the trolley wire.

The member C comprises a special headed bolt and nut and may be of various shapes.

The member A comprises the boss 2 which is internally threaded to receive a threaded stud on a hanger from which the support is suspended. Projecting in opposite directions from the boss 2 are the arms 3 and which are spaced from the upper edge of the member B. At the end of each arm 3 is a boss member 4 having a passage 5 therethrough to receive the shank of the member C. The member A may be made of a forging or a casting and made of wrought iron or steel or cast copper, bronze or brass or of malleableized cast iron. For most purposes I prefer the malleableized, cast iron as it is strong and comparatively cheap.

Figure 5:
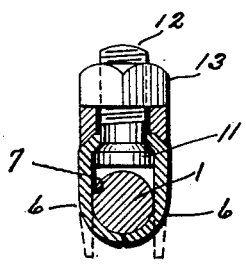
Fig. 5 is a sectional view on the line 5—5 of Fig. 1.

The member B comprises an inverted U shaped grooved member formed up out of sheet material and having a pair of depending lips 6 forming an open bottom groove 7 prior to the lips being formed about the trolley wire 1. The lips are shown as rounded and tapered at their ends as indicated at 8 or they may be formed as shown in my Patents 1,521,199 and 1,521,200 issued December 30, 1924. In Fig. 5 is shown a section on the line 5—5 of Fig. 1 which is adjacent the end of the ear and the lips are shown as being thinner at their abutting edges than on the side and this thickness of the abutting edges decreases as the section approaches the end of the ear and increases as the section is moved toward the center until the thickness of the lip edges is equal to that of the sides of the lips which is the thickness of the sheet metal from which the member B is made. This lip construction is clearly set forth in my prior patents referred to.

The member B is provided at its ends with a recessed portion 9 which is comparatively narrow, but having a greater length. The member B has a passage 10 leading into the recess or cavity 9 and through which projects the shank of the member C.

Figure 4:
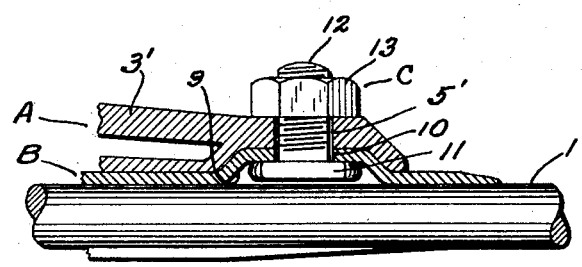
Fig. 4 is an enlarged sectional view of a modification of a portion of my invention as later described.

The member C may be of forged ferrous or non-ferrous metal and comprises a bolt portion 11, a shank 12 and a nut 13. The head portion may be of various shapes and sizes as shown in Figs. 1 and 4, but in all cases these heads are narrow as compared with their length so as to keep the width of the member B as narrow as possible, that is, not to exceed the diameter of the wire plus twice the thickness of the metal from which the member B is made. If desired, the bolt portion may be of steel and the nut 13 of a non-ferrous metal.

The end portions of the arms 3 are recessed and receive the projections on the member B as shown in Fig. 5 and then support the member B against side strains.

In Fig. 1 the arms 3 of the member A are shown as spaced from the member B and also the boss 2 but the boss may be made to engage the member B, while in Fig. 4 corresponding arm 3′ is grooved and shown as contacting with the upper edge of the member B. The first form allows the yielding of the part B relative to the member A from the hanger while in the latter form the member B is reinforced by the longitudinally grooved member A and in the second form by the boss 2.

The member C may consist of a separate head part 11 which is drilled and tapped to receive a cap screw which is the equivalent of making the shank 12 and nut 13 integral and the head 11 separate and drilled and tapped.

The passage 5 and 5′ through the member B may offer clearance to the shank 12 or may be slightly elongated as in case of a slot thus offering adjustability of the parts.

It will be seen that the member B may be renewed or it may be replaced by a member made of various metals as desired without the necessity of removing the member A from the hanger or scrapping the entire device as is done where the parts are unitary.

Variations will be evident to those skilled in the art.

I claim:—

1. A conductor support comprising an inverted U shaped sheet-metal-member having a groove and depending lips, a recess formed at each end of the member opening into the groove and having a passage thereunto through the wall of said member, a yoke member having a boss and arms projecting therefrom and having a passage through each end, each passage coinciding with one of the passages through the ends of the first member, a bolt for each recess and having a head therein and a shank projecting through the said corresponding passages and means on each shank to draw and hold the U member and yoke member together.

2. A supporting device comprising an inverted U shaped sheet-metal-member having a groove to receive a trolley wire, a pair of lips to bend about the wire and a cavity opening into the groove at each end, a yoke member having a central supporting boss and a passage at each free end, a passage through the wall of the U member at each end registering with its corresponding passage through the arm and means positioned in each cavity and projecting through the corresponding passages thereto to secure the members together.

3. A supporting device comprising an inverted U shaped sheet-metal-member having a groove for a trolley wire and lips to be bent about the wire and a cavity at each end of the member with a passage thereinto through the wall of the U member, a yoke member having a passage through each end registering with said corresponding passages in the U member and means positioned in said cavities to detachably secure the members together and means on the yoke to receive a support.

4. A supporting device comprising an inverted U shaped sheet-metal-member having a groove for a trolley wire and lips to be bent about the wire and a cavity at each end of the member with a passage thereinto through the wall of the U member, a yoke member having its ends only in contact with the U member and having a passage through each end registering with a corresponding passage in the U member and means positioned in said cavities to detachably secure the members together and means on the yoke to receive a support.

5. A supporting device comprising an inverted U shaped sheet-metal-member of copper having a groove to receive and hold a trolley wire and a cavity at each end and a passage through the wall of the U member opening into each cavity, a separately formed member of dissimilar metal with a passage at each end adjacent the aforesaid passages and means co-operating with each cavity and the corresponding passages to detachably hold the members together and means on the last member by which to support the device.

6. A supporting device comprising an inverted U shaped sheet-metal-member of copper having a groove to receive and hold a trolley wire and a cavity at each end and a passage through the wall of the U member into each cavity, a separately formed member of dissimilar metal with a passage at each end and adjacent the aforesaid passages and means co-operating with each cavity and the corresponding passages to detachably hold the members together and means on the last member by which to support the device, the separately formed member engaging the U member between its ends.

7. A holding member for a supporting device comprising an elongated U shaped sheet-metal-member forming a groove to receive and hold a trolley wire and lips to bend about the wire and pratically meet at their edges, a recess formed at each end opening into the groove and a passage through the wall of the U member opening into each and the lips being tapered back from the ends for a predetermined distance.

8. A supporting device comprising an arm member having a means of support between its ends and recessed means at each end of the arm, an inverted U shaped trolley wire holding member having a groove and a recess formed at each end, the wall of the U member surrounding the recess projecting from the surface of the U member and arranged to fit into one of the said recesses in the arm and a plurality of means to secure the U member to the arm at the ends.

9. A conductor support comprising an elongated yoke member having means to secure it to a support and a recess at each end of the yoke, an elongated sheet-metal member having a longitudinal extending groove in its lower face and projections from its upper face co-operating with the recesses in the yoke member and detachable means co-operating with the recesses and projections to hold the members assembled.

10. A conductor support comprising an elongated supporting member having means intermediate its ends to secure it to a support, an elongated U shaped member to receive and hold a trolley wire, recesses along one edge of the supporting member co-operating with projections on the bight on the U-shaped member and separately formed means associated with the recesses and projections to detachably hold the members together.

11. A conductor support comprising an elongated supporting member having means intermediate its ends to secure the member to a support, an elongated U shaped member forming a groove to receive a trolley wire and bendable lips to engage the wire, recesses formed along the bight of the U member opening into the groove and a passage through the wall of the U member into each recess and means secured to the supporting member and projecting through each passage and into the recess to secure the members together.

12. A conductor support comprising an elongated member having means intermediate its ends to secure the member to a support, an elongated U shaped member having a groove to receive a trolley wire and bendable lips to engage the wire, U member forming a cavity and a passage through the projection into the cavity and separately formed means to hold the members together and in assembled relation and comprising means secured to the supporting member and projecting into the cavity and having an enlargement therein.

13. As a new article of manufacture, a trolley wire hanger comprising a body adapted for suspension from a suitable stud, a bendable trolley wire receiving member seated on said body and having portions thereof depressed into said body, and means comprising a headed bolt for effecting connection between the bendable member and the body, said bolt having its head shaped to conform to the bendable member.

14. A trolley wire hanger comprising an elongated supporting body member having an exposed bottom surface and having a recess at each end of the body member, a member having bendable lips forming a wire receiving groove seated against the said surface and having depressions therein forming bosses seated in the recesses in the body member to prevent relative longitudinal movement of the members, and means removably securing the members together.

15. A trolley wire hanger comprising an elongated supporting body member having a downwardly projecting boss, a bendable wire receiving member having its bight seated in the body member at its ends and engaging the projecting boss, and headed studs and nuts securing the members together on each side of the projecting boss.

In testimony whereof I affix my signature.

SAMUEL S. MATTHES.